(12) United States Patent
Flinn et al.

(10) Patent No.: US 9,047,245 B2
(45) Date of Patent: *Jun. 2, 2015

(54) LOCATION-BASED PEOPLE MATCHING SYSTEM AND METHOD

(71) Applicant: ManyWorlds, Inc., Houston, TX (US)

(72) Inventors: Steven Dennis Flinn, Sugar Land, TX (US); Naomi Felina Moneypenny, Houston, TX (US)

(73) Assignee: ManyWorlds, Inc., Houston, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/968,657

(22) Filed: Aug. 16, 2013

(65) Prior Publication Data
US 2013/0339450 A1    Dec. 19, 2013

Related U.S. Application Data

(63) Continuation of application No. 13/212,774, filed on Aug. 18, 2011, now Pat. No. 8,515,900, which is a continuation of application No. 12/773,119, filed on May 4, 2010, now Pat. No. 8,060,462, which is a continuation of application No. 11/845,070, filed on Aug. 26, 2007, now Pat. No. 7,739,231.

(60) Provisional application No. 60/823,671, filed on Aug. 28, 2006.

(51) Int. Cl.
| | | |
|---|---|---|
| *G06F 7/00* | (2006.01) |
| *G06F 17/00* | (2006.01) |
| *G06F 15/173* | (2006.01) |
| *G06F 17/30* | (2006.01) |
| *G06Q 50/00* | (2012.01) |
| *H04L 29/06* | (2006.01) |

(52) U.S. Cl.
CPC .... *G06F 15/17306* (2013.01); *G06F 17/30699* (2013.01); *G06Q 50/01* (2013.01); *G06F 17/30943* (2013.01); *H04L 65/403* (2013.01)

(58) Field of Classification Search
None
See application file for complete search history.

(56) References Cited

U.S. PATENT DOCUMENTS

2006/0166740 A1    7/2006  Sufuentes

OTHER PUBLICATIONS

Takashi Yoshino et al, ""NAMBA: Location-Aware Collaboration System for Shopping and Meeting, IEEE Transactions on Consumer Electronics, vol. 48, No. 3, Aug. 2002, 8 pages.*
Petra Schubert et al., "Collaboration Platforms for Virtual Student Communities" IEEE 2002, 10 pages.

* cited by examiner

*Primary Examiner* — Uyen Le

(57) ABSTRACT

A location-based matching system and method matches users of a computer-implemented system in accordance with inferences of mutual interest between the users, whereby the inferences of mutual interest are based on mutual computer-implemented relationships and user location information. Inferences of mutual interest may also be in accordance with a physical object. The inferences of mutual interest may be with respect to interests by users in being physically proximal to each other or being physically proximal to a location associated with one of the users. Information associated with user matches may be delivered to a matched user in the form of a computer-implemented map.

20 Claims, 6 Drawing Sheets

LOCATION-BASED PEOPLE MATCHING SYSTEM AND METHOD

CROSS-REFERENCE TO RELATED APPLICATIONS

The present application is a continuation of U.S. patent application Ser. No. 13/212,774, now U.S. Pat. No. 8,515,900, which is a continuation of U.S. patent application Ser. No. 12/773,119, now U.S. Pat. No. 8,060,462, which is a continuation of U.S. patent application Ser. No. 11/845,070, now U.S. Pat. No. 7,739,231, which claimed benefit under 35 U.S.C. §119(e) of U.S. Provisional Patent Application No. 60/823,671, entitled "Mutual Commit People Matching Process," filed Aug. 28, 2006.

FIELD OF THE INVENTION

This invention relates to methods and systems for computer-based people recommendations and matching.

BACKGROUND OF THE INVENTION

People are interested in meeting or connecting with other people to foster rewarding relationships whether for business, shared interests, or romance.

Prior art online people matching approaches include social networking sites and dating sites. In some of these prior art processes and systems, there is a limited degree of automation in the generation of recommendations of people that might be of interest to potentially meet online or offline, or to potentially include in a contact group. These automated recommendations rely on determining the degree to which information within profiles that are explicitly provided by users of the system have similarities. This approach is limited by the amount of information that is, or can be, explicitly provided by the respective parties, and by the quality and sincerity of the information provided by the parties.

Further, in prior art online people matching processes, one of the parties has to overtly make contact with, or express interest in, a second party of interest. There can be an embarrassment factor for one or both parties that can inhibit such overt and transparent acts of expressing an interest in making contact, as a party's overture may be rejected. Or the overture may be accepted by the second party, but only for the purposes of not embarrassing the first party. In other words, acceptance may potentially be insincere, which is an uncomfortable situation for both parties.

These problems with prior art systems and processes both inhibit the development of contacts and relationships that would be mutually rewarding, as well as creating "contact inflation" of "mercy" relationships that have little or no value to one or both of the parties.

SUMMARY OF THE INVENTION

In accordance with the embodiments described herein, a method and system is disclosed for an automated mutual commit people matching process.

The present invention may apply the adaptive and/or recombinant methods and systems as described in PCT Patent Application No. PCT/US2004/37176, entitled "Adaptive Recombinant Systems," filed on Nov. 4, 2004, and may apply the adaptive and/or recombinant processes, methods, and/or systems as described in PCT Patent Application No. PCT/US2005/011951, entitled "Adaptive Recombinant Processes", filed on Apr. 8, 2005.

Other features and embodiments will become apparent from the following description, from the drawings, and from the claims.

DETAILED DESCRIPTION

Figure 1:
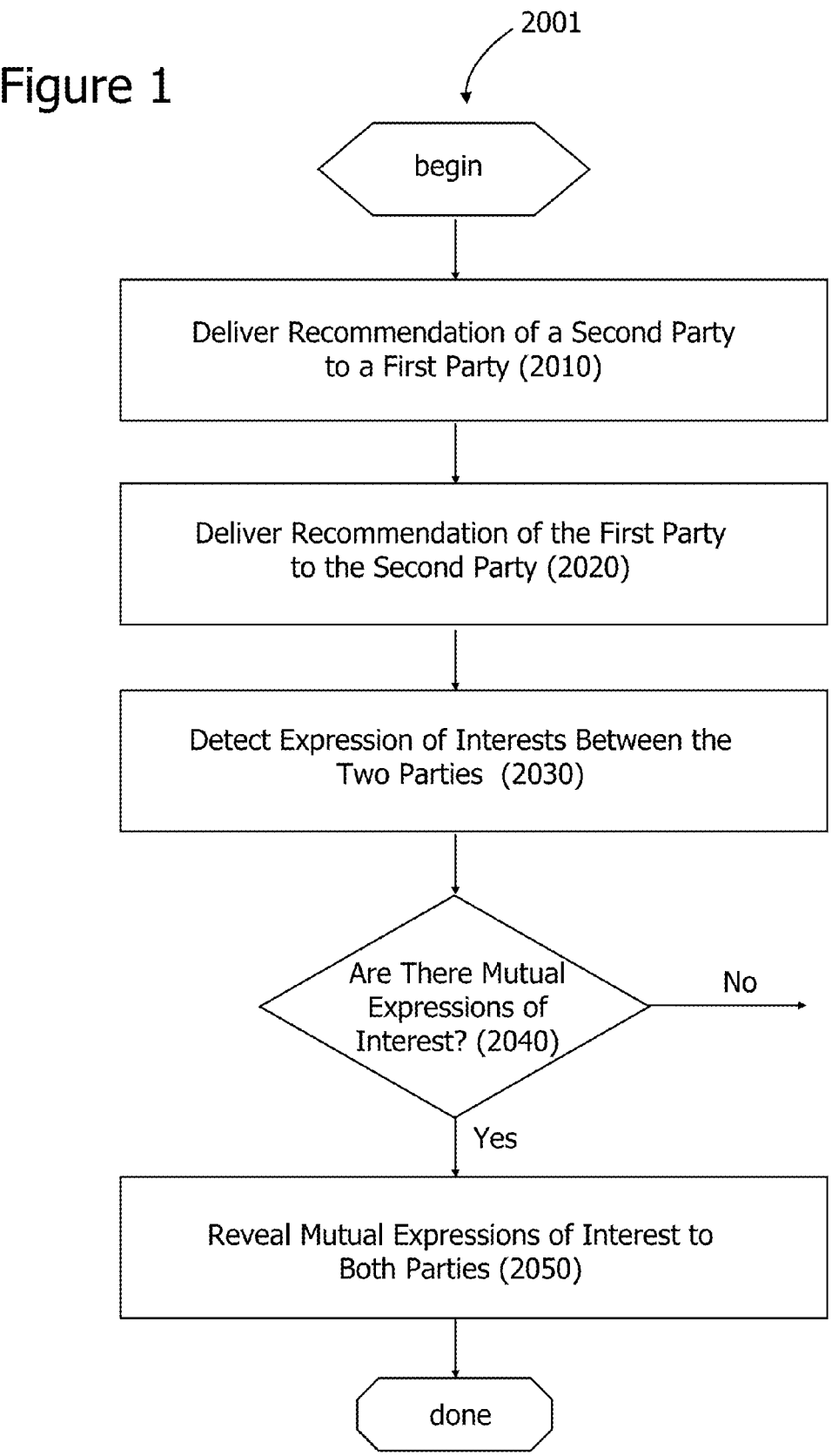
FIG. 1 is a flow diagram of a mutual commit people recommendation process, according to some embodiments.

In the following description, numerous details are set forth to provide an understanding of the present invention. However, it will be understood by those skilled in the art that the present invention may be practiced without these details and that numerous variations or modifications from the described embodiments may be possible.

In accordance with the embodiments described herein, a method and a system for an automated mutual commit people matching process is disclosed to address the shortcomings of prior art people referral, recommendation, and matching processes.

In some embodiments, the people matching method of the present invention may constitute an adaptive recommendation or sponsored recommendation as described in PCT Patent Application No. PCT/US2004/37176, entitled "Adaptive Recombinant Systems," filed on Nov. 4, 2004, or as described in PCT Patent Application No. PCT/US2005/011951, entitled "Adaptive Recombinant Processes", filed on Apr. 8, 2005, which are both hereby incorporated by reference as if set forth in their entirety.

The present invention includes two integrated novelties versus prior art: 1) an automated recommender system is applied to suggest parties of interest wherein the recommendation is based, at least in part, on inferences from the behaviors of one or both of the parties, and the recommendation may optionally include an explanation of why the recommendation was made, and 2) a double blind two party commitment process in which a bilateral expression of interest is revealed to the parties if and only if both parties have expressed a unilateral interest in the other. Many variations of this two-step integrated approach may be applied, as will be discussed in more detail herein.

The present invention has several advantages over prior art people matching methods and systems. First, the automated recommender system of the present invention introduces a "third party" (the computer-based recommender) to the match making; a third party that generates recommendations on people of interest based on information and logic that may be non-obvious to the recommendation recipient. Such an approach introduces a level of intrigue (because of the non-obviousness of the logic of the recommendation) and credibility (because inferences from behaviors are more credible than inferences solely from self-described attributes) that is missing from simple self description-based profile matching. In some embodiments, the computer-based recommender system may provide an explanation of why a first party was recommended to the second party. This may provide an enhanced level of perceived authority associated with the recommendation. Further, the "third party" recommender reduces embarrassment for recommended parties as the parties can "blame" the recommender system for suggesting the parties should connect, thus, at least in part, removing the onus or responsibility from the parties themselves. This enables many more valuable connections to be made than non-recommender system-based approaches, or with recommender systems based solely on information explicitly provided by the parties.

Second, the delivery of a people recommendation is made, in some embodiments of the present invention, so as to shield the expression of interest of a first party for a second party unless the second party also expresses an interest in the first party. Further, the system may choose, either by randomization or deterministic means, to not necessarily deliver bilateral recommendations to two parties, so that a party is not guaranteed that if they receive a recommendation of a second party, that the second party will receive a recommendation for the first party. This method reduces the potential for feelings of rejection if an expression of interest is not reciprocated, since it is not guaranteed that both parties received a recommendation for the other party.

In some embodiments not all the details (for example, name, organization, contact information) of the parties may be delivered by the recommender system, to reduce biases, or to reduce the risk of one of the parties contacting another party that has not expressed reciprocating interest.

FIG. 1 depicts a flow chart of the mutual commit people recommendation process, according to some embodiments. A recommendation of a second party is delivered to a first party 2010. The recommendation may be generated by a computer-based system based, at least in part, on behavioral-based inferences associated with the two parties. The recommendation may be one among a plurality of other people recommendations and/or recommendations of content (content may include, but is not limited to, web pages, documents, audio, video, and interactive applications). The recommendation delivery may include an explanation of why the recommendation was made, including indicating inferences of relevant or common interests, for expected bilateral interests, and the explanation may be accessed interactively by the recommendation recipient. The explanation may include reasoning based on behavioral-based information where the behavioral information may be associated with one or more usage behavior categories of Table 1.

At the same time, or at a later time, a recommendation of the first party may be delivered to the second party 2020. This recommendation may also be generated by a computer-based system based, at least in part, on behavioral-based inferences associated with the two parties.

An expression of interest is detected 2030 for each of the two parties for each other. The detection may be through an overt online indication such as, for example, marking a checkbox or any other type of overtly indicative behavior, or the detection may be based, at least in part, on inferences from non-overt behaviors. In other words, the indication of interest in a second party may be explicit and conscious by a first party, or it may be inferred by a computer-based system from implicit, unconscious and/or involuntary behaviors or responses of a party. As just one example, a physiological response (that is presumably involuntary) may be monitored by the computer-based system, as described in Table 1, and be used to infer interest in another party. In some embodiments, the expression of interest by one party toward another party, whether implicit or explicitly, may be determined by degree; for example, from low to high.

The existence of a mutual expression of interest is determined 2040. If there is a mutual expression of interest, or sufficient level of bilateral interest, then the mutual expression of interests are revealed to both parties 2050. The delivery of the notification of mutual expression of interest may be through any electronic or computer-based means, including, but not limited to, e-mail, instant messaging, and telephone. Contact information may be provided to each party so that they can make contact with one another. An explanation of why each party was recommended to the other may be included. The explanation may be interactive wherein more details are provided as they are requested by a party.

Figure 2:
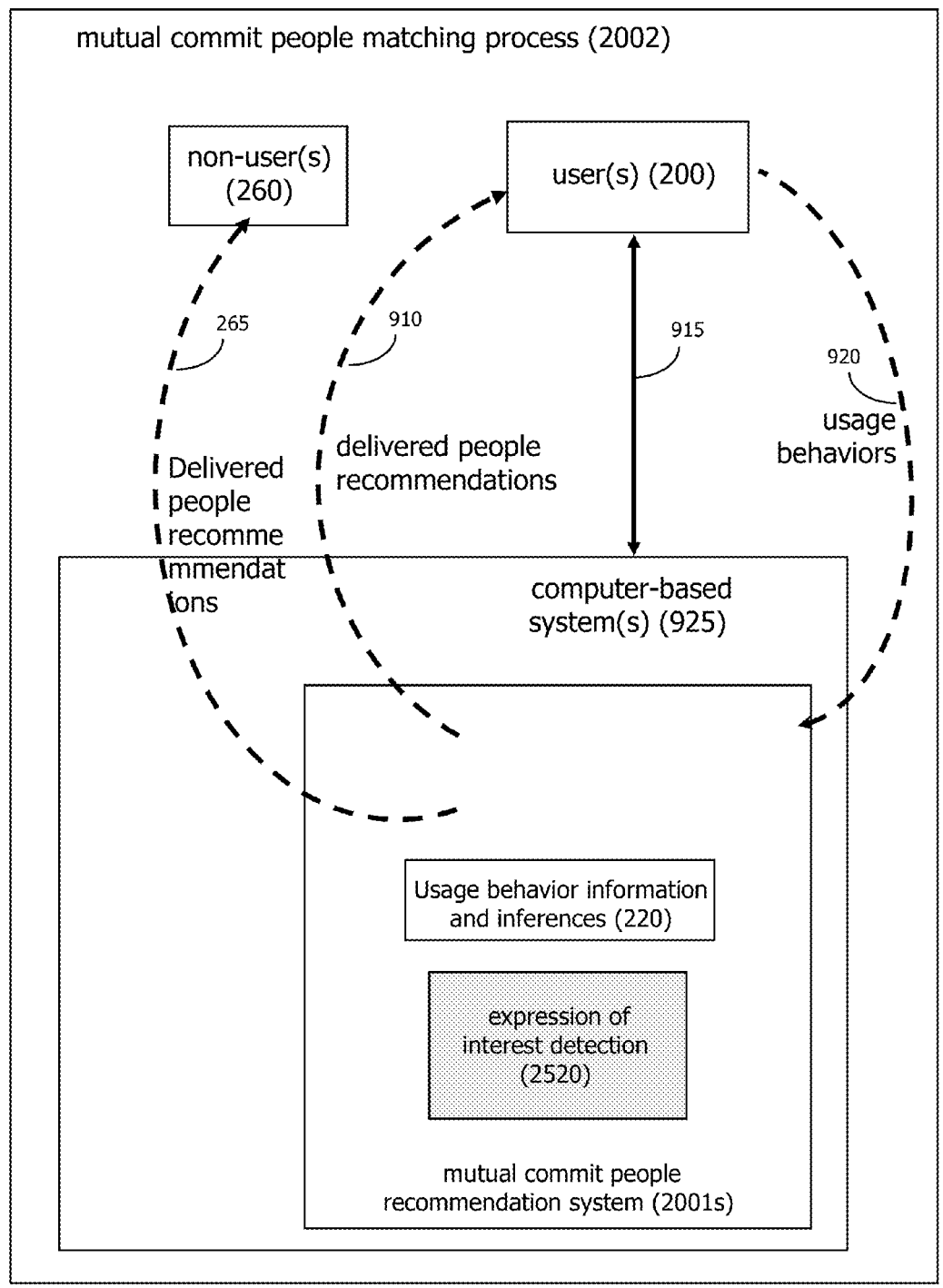
FIG. 2 is a block diagram of a computer-based mutual commit people matching process, according to some embodiments.

FIG. 2 represents a summary schematic of a computer-based mutual commit people matching process 2002. One or more users 200 interact with, or are monitored by, 915 one or more computer-based systems 925. The interactions 915 may be in conjunction with navigating the systems, performing a search, or any other usage behavior, including, but not limited to, those referenced by the usage behavior categories of Table 1. The interactions 915 may occur before a recommendation is delivered, or after a recommendation 910 is delivered to the one or more users 200.

Selective usage behaviors 920 associated with the one or more users 200 are accessible by the one or more computer based systems 925. The usage behaviors 920 may occur prior to, or after, the delivery of a recommendation 910 to the one or more users 200.

The one or more computer-based systems 925 include functions to execute some or all of the steps of the mutual commit people recommendation process 2001 of FIG. 1. The computer-based mutual commit recommendation process 2001s of the one or more computer-based systems 925 of FIG. 2 includes a function to manage usage behavior information and inferences on user preferences and/or intentions 220, and includes an expression of interest detection function 2520. It also may contain functions, not explicitly shown in FIG. 2 to deliver notification of mutual interests, and to provide explanatory means with regard to people recommendations 910.

The one or more computer-based systems 925 deliver people recommendations 910 to the one or more users 200 and/or non-users 265 based, at least in part, on inferences of usage behaviors 920. In some embodiments, the one or more computer-based systems 925 may use explicit profiling information associated with the users/parties to augment inferences of usage behaviors 920 in delivering people recommendations 910.

The one or more computer-based systems may then detect 2520 any expressions 915 of mutual interests associated with the recommendations 910,265. The expressions 915 of interest may be explicit by the parties, or may constitute computer-based inferences from, at least in part, the behavior categories and associated behaviors described in Table 1. If mutual expressions 915 of interest are detected 2520 by the one or more computer-based systems 925, then the mutual interest is revealed to the respective parties by the one or more computer-based systems 925.

User Behavior Categories

In Table 1, a variety of different user behaviors 920, which, may be used by the one or more computer-based applications 925 as a basis for recommending a first person to a second person. The user behaviors 920 may also be assessed by the one or more computer-based applications 925 with regard to determining the level of interest in the first person by the second person after the said recommendation. This expression of interest may be inferred from behaviors of the second person with regard to direct representations of the first person, and/or with regard to derivative objects or proxies of the person (such as authored or owned content). The usage behaviors 920 may be associated with the entire community of users, one or more sub-communities, or with individual users or users of the one of more computer-based applications 925.

It should be emphasized again that the usage behaviors described in Table 1 and the accompanying descriptions may apply to a priori systems use 920 (that is, prior to the delivery of a recommendation 910,265) or behaviors, such as expressions of interest with regard to another party, that is exhibited after receiving a recommendation, where the recommendation may be of another party.

TABLE 1

Usage behavior categories and usage behaviors

| usage behavior category | usage behavior examples |
| --- | --- |
| navigation and access | activity, content and computer application accesses, including buying/selling paths of accesses or click streams execution of searches and/or search history |
| subscription and self-profiling | personal or community subscriptions to process topical areas interest and preference self-profiling affiliation self-profiling (e.g., job function) |
| collaborative | referral to others discussion forum activity direct communications (voice call, messaging) content contributions or structural alterations |
| reference | personal or community storage and tagging personal or community organizing of stored or tagged information |
| direct feedback | user ratings of activities, content, computer applications and automatic recommendations user comments |
| physiological responses | direction of gaze brain patterns blood pressure heart rate |
| environmental conditions and location | current location location over time relative location to users/object references current time current weather condition |

A first category of process usage behaviors 920 is known as system navigation and access behaviors. System navigation and access behaviors include usage behaviors 920 such as accesses to, and interactions with computer-based applications and content such as documents, Web pages, images, videos, TV channels, audio, radio channels, multi-media, interactive content, interactive computer applications, e-commerce applications, or any other type of information item or system "object." Such content or objects may be representations of people, and may include, such representations of people may include, but are not limited to, pictures of the person, videos of the person, voice recordings, biographical documents, interests, etc.

These process usage behaviors may be conducted through use of a keyboard, a mouse, oral commands, or using any other input device. Usage behaviors 920 in the system navigation and access behaviors category may include, but are not limited to, the viewing or reading of displayed information, typing written information, interacting with online objects orally, or combinations of these forms of interactions with computer-based applications. This category includes the explicit searching for information, using, for example, a search engine. The search term may be in the form of a word or phrase to be matched against documents, pictures, webpages, or any other form of on-line content. Alternatively, the search term may be posed as a question by the user.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the one or more computer-based systems 925, or may be associated with any other subset of the one or more computer-based systems 925. Subscriptions may thus indicate the intensity of interest with regard to elements of the one or more computer-based systems 925. The delivery of information to fulfill subscriptions may occur online, such as through electronic mail (email), on-line newsletters, XML feeds, etc., or through physical delivery of media.

Self-profiling refers to other direct, persistent (unless explicitly changed by the user) indications explicitly designated by the one or more users regarding their preferences and/or intentions and interests, or other meaningful attributes. A user 200 may explicitly identify interests or affiliations, such as job function, profession, or organization, and preferences and/or intentions, such as representative skill level (e.g., novice, business user, advanced). Self-profiling enables the one or more computer-based systems 925 to infer explicit preferences and/or intentions of the user. For example, a self-profile may contain information on skill levels or relative proficiency in a subject area, organizational affiliation, or a position held in an organization. Self profiling may also include information on interests with regard to meeting other people online or offline. For example, they may include criteria for location, age, education, gender, physical features and the like pertaining to people the user may wish to meet or connect with. A user 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and/or intentions and interests with regard to system use and associated topical areas, and with regard to degree of affinity with other user community subsets. A user may identify preferred methods of information receipt or learning style, such as visual or audio, as well as relative interest levels in other communities.

A third category of usage behaviors 920 is known as collaborative behaviors. Collaborative behaviors are interactions among the one or more users. Collaborative behaviors may thus provide information on areas of interest and intensity of interest. Interactions including online referrals of elements or subsets of the one or more computer-based systems 925, such as through email, whether to other users or to non-users, are types of collaborative behaviors obtained by the one or more computer-based systems 925.

Other examples of collaborative behaviors include, but are not limited to, online discussion forum activity, contributions of content or other types of objects to the one or more computer-based systems 925, or any other alterations of the elements, objects or relationships among the elements and objects of one or more computer-based systems 925. Collaborative behaviors may also include general user-to-user communications, whether synchronous or asynchronous, such as email, instant messaging, interactive audio communications, and discussion forums, as well as other user-to-user communications that can be tracked by the one or more computer-based systems 925.

A fourth category of process usage behaviors 920 is known as reference behaviors. Reference behaviors refer to the marking, designating, saving or tagging of specific elements or objects of the one or more computer-based systems 925 for reference, recollection or retrieval at a subsequent time. Tagging may include creating one or more symbolic expressions, such as a word or words, associated with the corresponding elements or objects of the one or more computer-based systems 925 for the purpose of classifying the elements or objects. The saved or tagged elements or objects may be organized in a manner customizable by users. The referenced elements or objects, as well as the manner in which they are organized by the one or more users, may provide information on inferred interests of the one or more users and the associated intensity of the interests.

A fifth category of process usage behaviors 920 is known as direct feedback behaviors. Direct feedback behaviors include ratings or other indications of perceived quality by individuals of specific elements or objects of the one or more computer-based systems 925, or the attributes associated with the corresponding elements or objects. The direct feedback behaviors may therefore reveal the explicit preferences and/or intentions of the user. In the one or more computer-based systems 925, the recommendations 910 may be rated by users 200. This enables a direct, adaptive feedback loop, based on explicit preferences and/or intentions specified by the user. Direct feedback also includes user-written comments and narratives associated with elements or objects of the computer-based system 925.

A sixth category of process usage behaviors is known as physiological responses. These responses or behaviors are associated with the focus of attention of users and/or the intensity of the intention, or any other aspects of the physiological responses of one or more users 200. For example, the direction of the visual gaze of one or more users may be determined. This behavior can inform inferences associated with preferences and/or intentions or interests even when no physical interaction with the one or more computer-based systems 925 is occurring. Even more direct assessment of the level of attention may be conducted through access to the brain patterns or signals associated with the one or more users. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by one or more regions of the brain.

Physiological responses may include any other type of physiological response of a user 200 that may be relevant for making preference or interest inferences, independently, or collectively with the other usage behavior categories. Other physiological responses may include, but are not limited to, utterances, gestures, movements, or body position. Physiological responses may also include other physical response phenomena such as, but not limited to, breathing rate, heart rate, temperature, perspiration, blood pressure, or galvanic response.

A seventh category of process usage behaviors is known as environmental conditions and physical location behaviors. Physical location behaviors identify physical location and mobility behaviors of users. The location of a user may be inferred from, for example, information associated with a Global Positioning System or any other positionally or locationally aware system or device, or may be inferred directly from location information input by a user (e.g., a zip code or street address), or otherwise acquired by the computer-based systems 925. The physical location of physical objects referenced by elements or objects of one or more computer-based systems 925 may be stored for future reference. Proximity of a user to a second user (including a first person that will be, or has already been, recommended to a second person), or to physical objects referenced by elements or objects of the computer-based application, may be inferred. The length of time, or duration, at which one or more users reside in a particular location may be used to infer intensity of interests associated with the particular location, or associated with objects that have a relationship to the physical location. Derivative mobility inferences may be made from location and time data, such as the direction of the user, the speed between locations or the current speed, the likely mode of transportation used, and the like. These derivative mobility inferences may be made in conjunction with geographic contextual information or systems, such as through interaction with digital maps or map-based computer systems. Environmental conditions may include the time of day, the weather, lighting levels, sound levels, and any other condition of the environment around the one or more users 200.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the one or more computer-based systems 925. The temporal patterns may include historical patterns, including how recently an element, object or item of content associated with one or more computer-based systems 925. For example, more recent behaviors may be inferred to indicate more intense current interest than less recent behaviors.

Another temporal pattern that may be tracked and contribute to preference inferences that are derived, is the duration associated with the access or interaction with the elements, objects or items of content of the one or more computer-based systems 925, or the user's physical proximity to physical objects (including people) referenced by system objects of the one or more computer-based systems 925, or the user's physical proximity to other users. For example, longer durations may generally be inferred to indicate greater interest than short durations. In addition, trends over time of the behavior patterns may be captured to enable more effective inference of interests and relevancy. Since delivered recommendations 910 may include one or more elements, objects or items of content of the one or more computer-based systems 925, the usage pattern types and preference inferencing may also apply to interactions of the one or more users with the delivered recommendations 910 themselves, including accesses of, or interactions with, explanatory information regarding the logic or rational that the one more computer-based systems 925 used in deliver the recommendation 910 to the user.

User Behavior and Usage Framework

Figure 3:
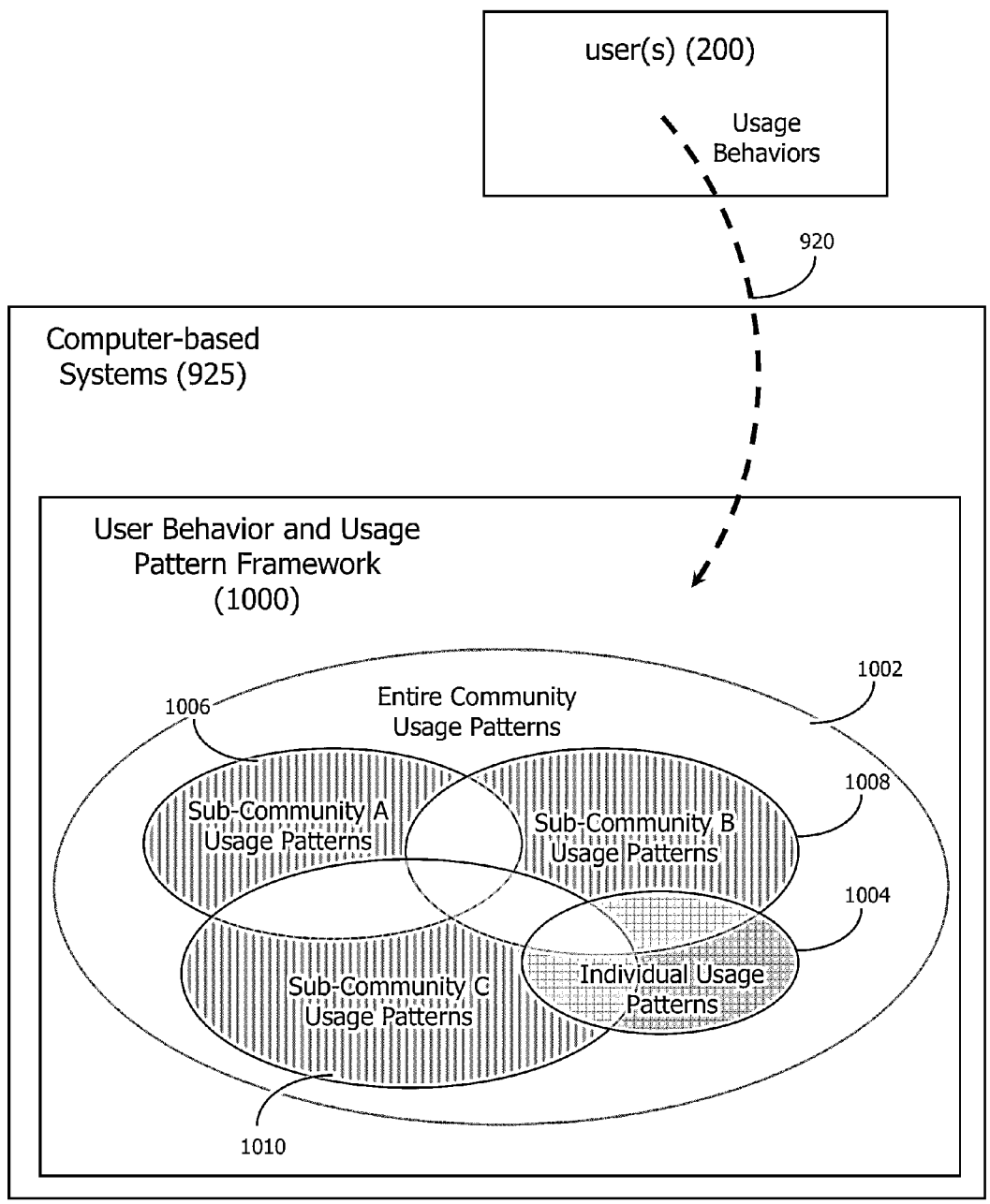
FIG. 3 is a diagram of a usage behavior framework, according to some embodiments.

FIG. 3 depicts a usage framework 1000 for performing preference and/or intention inferencing of tracked or monitored usage behaviors 920 by the one or more computer-based systems 925. The usage framework 1000 summarizes the manner in which usage patterns are managed within the one or more computer-based systems 925. Usage behavioral patterns associated with an entire community, affinity group, or segment of users 1002 are captured by the one or more computer-based systems 925. In another case, usage patterns specific to an individual, shown in FIG. 3 as individual usage patterns 1004, are captured by the one or more computer-based systems 925. Various sub-communities of usage associated with users may also be defined, as for example "sub-community A" usage patterns 1006, "sub-community B" usage patterns 1008, and "sub-community C" usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single user or multiple users. Sub-communities may likewise include one or more users. Thus, the individual usage patterns 1004 in FIG. 3 may also be described as representing the usage patterns of a community or a sub-community. For the one or more computer-based systems 925, usage behavior patterns may be segmented among communities and individuals so as to effectively enable adaptive advertising delivery 910 for each sub-community or individual.

The communities identified by the one or more computer-based systems 925 may be determined through self-selection, through explicit designation by other users or external administrators (e.g., designation of certain users as "experts"), or through automatic determination by the one or more computer-based systems 925. The communities themselves may have relationships between each other, of multiple types and values. In addition, a community may be composed not of human users, or solely of human users, but instead may include one or more other computer-based systems, which may have reason to interact with the one or more computer-based systems 925. Or, such computer-based systems may provide an input into the one or more computer-based systems 925, such as by being the output from a search engine. The interacting computer-based system may be another instance of the one or more computer-based systems 925.

The usage behaviors 920 included in Table 1 may be categorized by the one or more computer-based systems 925 according to the usage framework 1000 of FIG. 3. For example, categories of usage behavior may be captured and categorized according to the entire community usage patterns 1002, sub-community usage patterns 1006, and individual usage patterns 1004. The corresponding usage behavior information may be used to infer preferences and/or intentions and interests at each of the user levels.

Multiple usage behavior categories shown in Table 1 may be used by the one or more computer-based systems 925 to make reliable inferences of the preferences and/or intentions and/or intentions of a user with regard to elements, objects, or items of content associated with the one or more computer-based systems 925. There may be different preference inferencing results for different users.

By introducing different or additional behavioral characteristics, such as the duration of access of an item of content, on which to base updates to the structure of one or more computer-based systems 925, more adaptive and relevant people recommendations are enabled. For example, duration of access will generally be much less correlated with navigational proximity than access sequences will be, and therefore provide a better indicator of true user preferences and/or intentions and/or intentions. Therefore, combining access sequences and access duration will generally provide better inferences and associated system structural updates than using either usage behavior alone. Effectively utilizing additional usage behaviors as described above will generally enable increasingly effective system structural updating. In addition, the one or more computer-based systems 925 may employ user affinity groups to enable even more effective system structural updating than are available merely by applying either individual (personal) usage behaviors or entire community usage behaviors.

Furthermore, relying on only one or a limited set of usage behavioral cues and signals may more easily enable potential "spoofing" or "gaming" of the one or more computer-based systems 925. "Spoofing" or "gaming" the one or more computer-based systems 925 refers to conducting consciously insincere or otherwise intentional usage behaviors 920, so as to influence the costs of recommendations 910 of the one or more computer-based systems 925. Utilizing broader sets of system usage behavioral cues and signals may lessen the effects of spoofing or gaming. One or more algorithms may be employed by the one or more computer-based systems 925 to detect such contrived usage behaviors, and when detected, such behaviors may be compensated for by the preference and interest inferencing algorithms of the one or more computer-based systems 925.

In some embodiments, the one or more computer-based systems 925 may provide users 200 with a means to limit the tracking, storing, or application of their usage behaviors 920. A variety of limitation variables may be selected by the user 200. For example, a user 200 may be able to limit usage behavior tracking, storing, or application by usage behavior category described in Table 1. Alternatively, or in addition, the selected limitation may be specified to apply only to particular user communities or individual users 200. For example, a user 200 may restrict the application of the full set of her process usage behaviors 920 to preference or interest inferences by one or more computer-based systems 925 for application to only herself, and make a subset of process behaviors 920 available for application to users only within her workgroup, but allow none of her process usage behaviors to be applied by the one or more computer-based systems 925 in making inferences of preferences and/or intentions and/or intentions or interests for other users.

User Communities

As described above, a user associated with one or more systems 925 may be a member of one or more communities of interest, or affinity groups, with a potentially varying degree of affinity associated with the respective communities. These affinities may change over time as interests of the user 200 and communities evolve over time. The affinities or relationships among users and communities may be categorized into specific types. An identified user 200 may be considered a member of a special sub-community containing only one member, the member being the identified user. A user can therefore be thought of as just a specific case of the more general notion of user or user segments, communities, or affinity groups.

Figure 4:
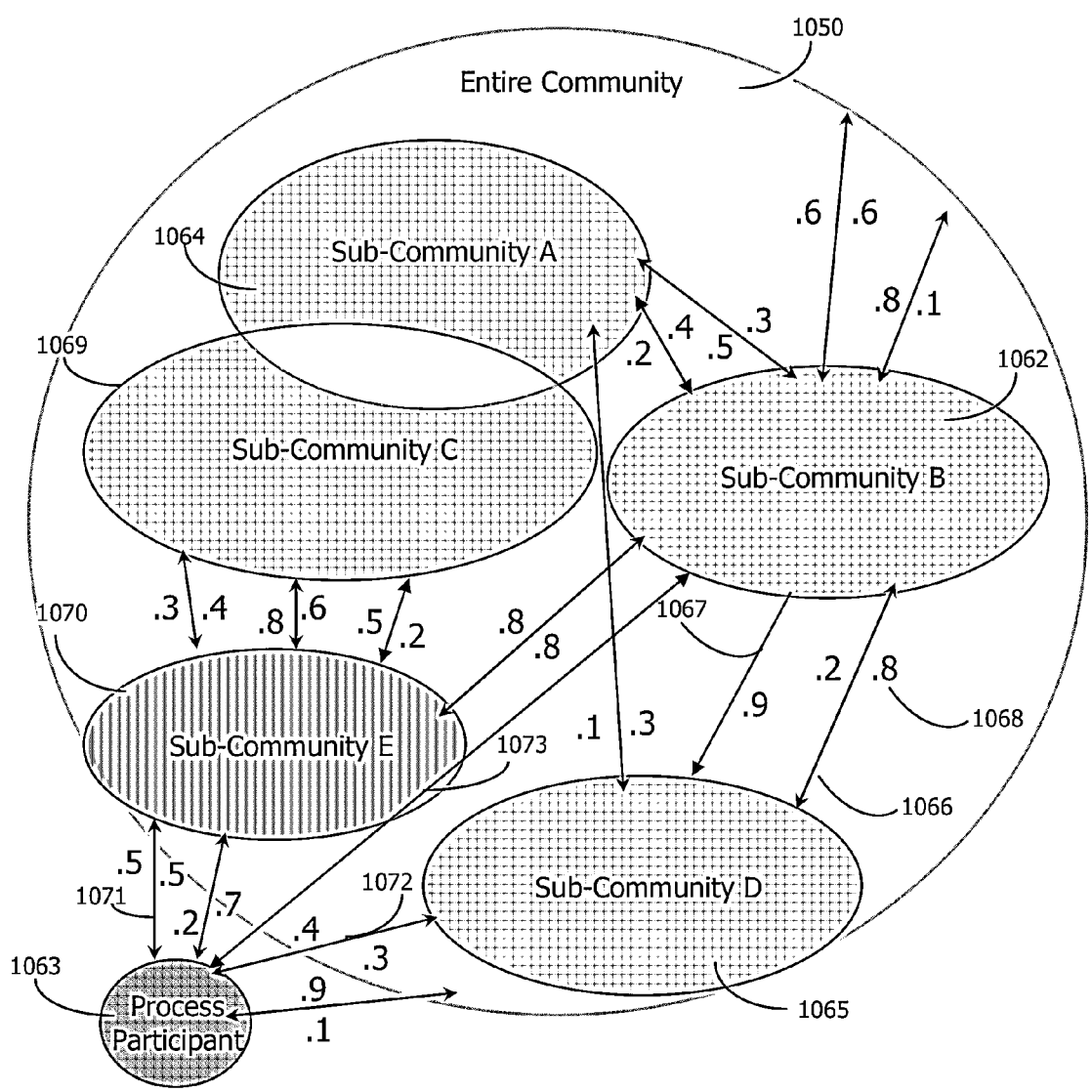
FIG. 4 is a diagram of a user communities and associated relationships, according to some embodiments.

FIG. 4 illustrates the affinities among user communities and how these affinities may automatically or semi-automatically be updated by the one or more computer-based systems 925 based on user preferences and/or intentions which are derived from user behaviors 920. An entire community 1050 is depicted in FIG. 4. The community may extend across organizational, functional, or process boundaries. The entire community 1050 includes sub-community A 1064, sub-community B 1062, sub-community C 1069, sub-community D 1065, and sub-community E 1070. A user 1063 who is not part of the entire community 1050 is also featured in FIG. 4.

Sub-community B 1062 is a community that has many relationships or affinities to other communities. These relationships may be of different types and differing degrees of relevance or affinity. For example, a first relationship 1066 between sub-community B 1062 and sub-community D 1065 may be of one type, and a second relationship 1067 may be of a second type. (In FIG. 4, the first relationship 1066 is depicted using a double-pointing arrow, while the second relationship 1067 is depicted using a unidirectional arrow.)

The relationships 1066 and 1067 may be directionally distinct, and may have an indicator of relationship or affinity associated with each distinct direction of affinity or relationship. For example, the first relationship 1066 has a numerical value 1068, or relationship value, of "0.8." The relationship value 1068 thus describes the first relationship 1066 between sub-community B 1062 and sub-community D 1065 as having a value of 0.8.

The relationship value may be scaled as in FIG. 4 (e.g., between 0 and 1), or may be scaled according to another interval. The relationship values may also be bounded or unbounded, or they may be symbolically represented (e.g., high, medium, low).

The user 1063, which could be considered a user community including a single member, may also have a number of relationships to other communities, where these relationships are of different types, directions and relevance. From the perspective of the user 1063, these relationship types may take many different forms. Some relationships may be automatically formed by the one or more computer-based systems 925, for example, based on interests or geographic location or similar traffic/usage patterns. Thus, for example the entire community 1050 may include users in a particular city. Some relationships may be context-relative. For example, a community to which the user 1063 has a relationship could be associated with a certain process, and another community could be related to another process. Thus, sub-community E 1070 may be the users associated with a product development business to which the user 1063 has a relationship 1071; sub-community B 1062 may be the members of a cross-business innovation process to which the user 1063 has a relationship 1073; sub-community D 1065 may be experts in a specific domain of product development to which the user 1063 has a relationship 1072. The generation of new communities which include the user 1063 may be based on the inferred interests of the user 1063 or other users within the entire community 1050.

Membership of communities may overlap, as indicated by sub-communities A 1064 and C 1069. The overlap may result when one community is wholly a subset of another community, such as between the entire community 1050 and sub-community B 1062. More generally, a community overlap will occur whenever two or more communities contain at least one user or user in common. Such community subsets may be formed automatically by the one or more systems 925, based on preference inferencing from user behaviors 920. For example, a subset of a community may be formed based on an inference of increased interest or demand of particular content or expertise of an associated community. The one or more computer-based systems 925 is also capable of inferring that a new community is appropriate. The one or more computer-based systems 925 will thus create the new community automatically.

For each user, whether residing within, say, sub-community A 1064, or residing outside the community 1050, such as the user 1063, the relationships (such as arrows 1066 or 1067), affinities, or "relationship values" (such as numerical indicator 1068), and directions (of arrows) are unique.

Accordingly, some relationships (and specific types of relationships) between communities may be unique to each user. Other relationships, affinities, values, and directions may have more general aspects or references that are shared among many users, or among all users of the one or more computer-based systems 925. A distinct and unique mapping of relationships between users, such as is illustrated in FIG. 4, could thus be produced for each user by the one or more computer-based systems 925.

The one or more computer-based systems 925 may automatically generate communities, or affinity groups, based on user behaviors 920 and associated preference inferences. In addition, communities may be identified by users, such as administrators of the process or sub-process instance 930. Thus, the one or more computer-based systems 925 utilizes automatically generated and manually generated communities.

The communities, affinity groups, or user segments aid the one or more computer-based systems 925 in matching interests optimally, developing learning groups, prototyping process designs before adaptation, and many other uses. For example, some users that use or interact with the one or more computer-based systems 925 may receive a preview of a new adaptation of a process for testing and fine-tuning, prior to other users receiving this change.

The users or communities may be explicitly represented as elements or objects within the one or more computer-based systems 925.

Preference and/or Intention Inferences

Figure 5:
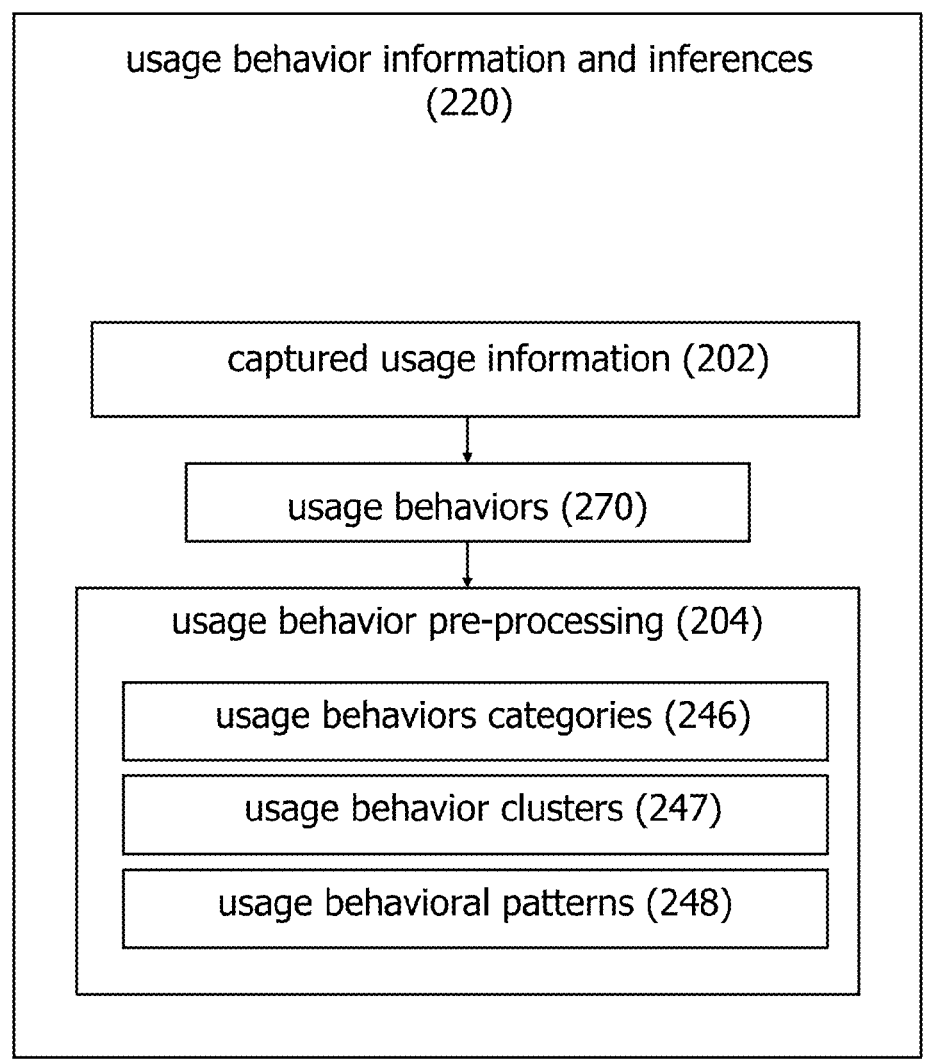
FIG. 5 is a block diagram of a the usage behavior information and inferences function, according to some embodiments.

The usage behavior information and inferences function 220 of the one or more computer-based systems 925 is depicted in the block diagram of FIG. 5. Recall from FIG. 2 that the usage behavior information and inferences function 220 tracks or monitor usage behaviors 920 of users 200. The usage behavior information and inferences function 220 denotes captured usage information 202, further identified as usage behaviors 270, and usage behavior pre-processing 204. The usage behavior information and inferences function 220 thus reflects the tracking, storing, classification, categorization, and clustering of the use and associated usage behaviors 920 of the one or more users or users 200 interacting with the one or more computer-based systems 925.

The captured usage information 202, known also as system usage or system use 202, includes any interaction by the one or more users or users 200 with the system, or monitored behavior by the one or more users 200. The one or more computer-based systems 925 may track and store user key strokes and mouse clicks, for example, as well as the time period in which these interactions occurred (e.g., timestamps), as captured usage information 202. From this captured usage information 202, the one or more computer-based systems 925 identifies usage behaviors 270 of the one or more users 200 (e.g., web page access or physical location changes of the user). Finally, the usage behavior information and inferences function 220 includes usage-behavior pre-processing, in which usage behavior categories 246, usage behavior clusters 247, and usage behavioral patterns 248 are formulated for subsequent processing of the usage behaviors 270 by the one or more computer-based systems 925. Some usage behaviors 270 identified by the one or more computer-based systems 925, as well as usage behavior categories 246 designated by the one or more computer-based systems 925, are listed in Table 1.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1, above. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200, potentially including environmental aspects of the physical location(s). The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences and/or intentions 252 associated with other systems.

Computing Infrastructure

Figure 6:
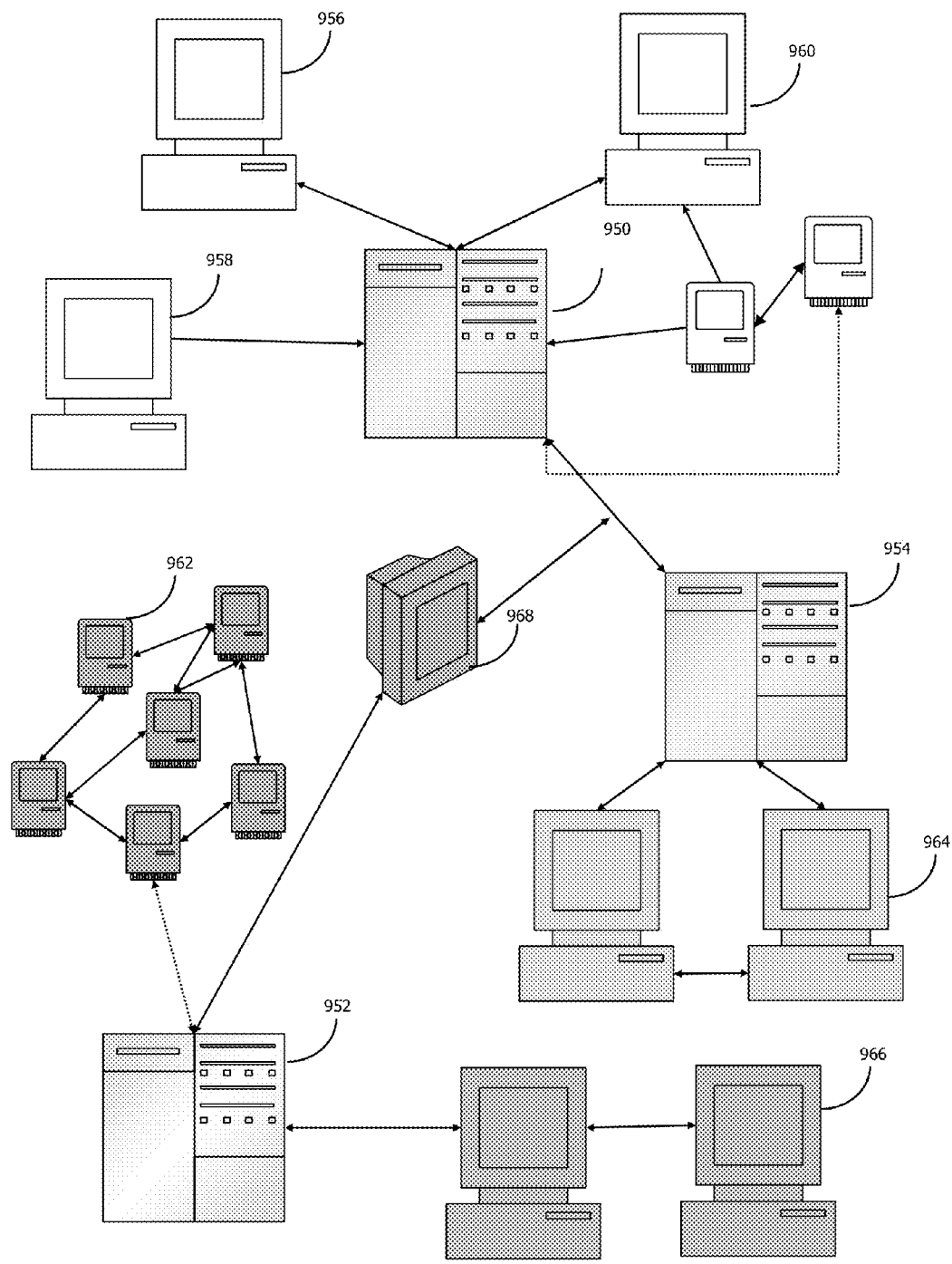
FIG. 6 is a diagram of alternative computing topologies of the mutual commit people matching process, according to some embodiments.

FIG. 6 depicts various computer hardware and network topologies that the computer-based mutual commit people matching process 2002 may embody.

Servers 950, 952, and 954 are shown, perhaps residing at different physical locations, and potentially belonging to different organizations or individuals. A standard PC workstation 956 is connected to the server in a contemporary fashion, potentially through the Internet. It should be understood that the workstation 956 can represent any computer-based device, mobile or fixed, including a set-top box. In this instance, the relevant systems, in part or as a whole, may reside on the server 950, but may be accessed by the workstation 956. A terminal or display-only device 958 and a workstation setup 960 are also shown. The PC workstation 956 or servers 950 may be connected to a portable processing device (not shown), such as a mobile telephony device, which may be a mobile phone or a personal digital assistant (PDA). The mobile telephony device or PDA may, in turn, be connected to another wireless device such as a telephone or a GPS receiver.

FIG. 6 also features a network of wireless or other portable devices 962. The relevant systems may reside, in part or as a whole, on all of the devices 962, periodically or continuously communicating with the central server 952, as required. A workstation 964 connected in a peer-to-peer fashion with a plurality of other computers is also shown. In this computing topology, the relevant systems, as a whole or in part, may reside on each of the peer computers 964.

Computing system 966 represents a PC or other computing system, which connects through a gateway or other host in order to access the server 952 on which the relevant systems, in part or as a whole, reside. An appliance 968, includes software "hardwired" into a physical device, or may utilize software running on another system that does not itself host the relevant systems. The appliance 968 is able to access a computing system that hosts an instance of one of the relevant systems, such as the server 952, and is able to interact with the instance of the system.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A computer-implemented method, comprising:
   enabling a first user of a computer-implemented system and a second user of the computer-implemented system to mutually establish a reciprocal computer-implemented relationship;
   accessing the reciprocal computer-implemented relationship between the first user of the computer-implemented system and the second user of the computer-implemented system;
   identifying a first physical location associated with the first user through the first user's use of a first portable processor-based device;
   identifying a second physical location associated with the second user through the second user's use of a second portable processor-based device;
   matching the first user and the second user based on an inference of a mutual interest, wherein the inference of the mutual interest is automatically determined by a processor-based device and is based, at least in part, on the reciprocal computer-implemented relationship, the first location associated with the first user, and the second location associated with the second user; and
   delivering information associated with the matching to the first user.

2. The method of claim 1, further comprising:
   delivering the information associated with the matching to the first user, wherein the delivering of the information is in response to a search request by the first user.

3. The method of claim 1, further comprising:
   enabling the first user of the computer-implemented system and the second user of the computer-implemented system to mutually establish the reciprocal computer-implemented relationship, wherein the reciprocal computer-implemented relationship is a reciprocal subscribing relationship.

4. The method of claim 1, further comprising:
   identifying the second physical location associated with the second user, wherein the second physical location is inferred to be the current physical location of the second user.

5. The method of claim 1, further comprising:
   matching the first user and the second user based on the inference of the mutual interest, wherein the mutual interest is inferred to be an interest by the first user and the second user to be physically proximal.

6. The method of claim 1, further comprising:
matching the first user and the second user based on the inference of the mutual interest, wherein the mutual interest is inferred to be an interest by the first user to be physically proximal to the second location.

7. The method of claim 1, further comprising:
delivering the information associated with the matching to the first user, wherein the information comprises a computer-implemented map.

8. A system comprising one or more processor-based devices configured to execute:
a relationship management function that accesses a reciprocal computer-implemented relationship between a first user of a computer-implemented system and a second user of the computer-implemented system, wherein the reciprocal computer-implemented relationship is mutually established by the first user and the second user;
a user physical location identification function that identifies a first physical location that is associated with the first user and a second physical location that is associated with the second user;
a mutual interest inference function that infers a mutual interest between the first user and the second user based, at least in part, on the reciprocal computer-implemented relationship, the first physical location, and the second location;
a user matching function that determines a match between the first user and the second user in accordance with the inferred mutual interest; and
a match delivery function that delivers information to the first user that is associated with the match between the first user and the second user.

9. The system of claim 8, further comprising:
the match delivery function that delivers the information to the first user that is associated with the match between the first user and the second user, wherein the information is delivered to the first user in response to a search request performed by the first user.

10. The system of claim 8, further comprising:
the relationship management function that accesses the reciprocal computer-implemented relationship between the first user of the computer-implemented system and the second user of the computer-implemented system, wherein the reciprocal computer-implemented relationship is a subscribing relationship.

11. The system of claim 8, further comprising:
the user physical location identification function that identifies the first physical location that is associated with the first user and the second physical location that is associated with the second user, wherein the second physical location is inferred to be the current physical location of the second user.

12. The system of claim 8, further comprising:
the mutual interest inference function that infers the mutual interest between the first user and the second user, wherein the mutual interest is inferred to be an interest by the first user and the second user to be physically proximal.

13. The system of claim 8, further comprising:
the mutual interest inference function that infers the mutual interest between the first user and the second user, wherein the mutual interest is inferred to be an interest by the first user to be physically proximal to the second location.

14. The system of claim 8, further comprising:
the user match delivery function that delivers information to the first user that is associated with the match between the first user and the second user, wherein the information comprises a computer-implemented map.

15. A system comprising one or more processor-based devices configured to execute:
a relationship management function that accesses a reciprocal computer-implemented relationship between a first user of a computer-implemented system and a second user of the computer-implemented system, wherein the reciprocal computer-implemented relationship is mutually established by the first user and the second user;
a user physical location identification function that identifies a first physical location that is associated with the first user and a second physical location that is associated with the second user;
a physical object identification function that identifies a non-human physical object that is associated with the second physical location;
a mutual interest inference function that infers a mutual interest between the first user and the second user based, at least in part, on the reciprocal computer-implemented relationship, the first physical location, and the non-human physical object;
a user matching function that determines a match between the first user and the second user in accordance with the inferred mutual interest; and
a match delivery function that delivers information to the first user that is associated with the match between the first user and the second user.

16. The system of claim 15, further comprising:
the user matching function, wherein the user matching function generates the match in response to a search request by the first user.

17. The system of claim 15, further comprising:
the mutual interest inference function that infers the mutual interest between the first user and the second user, wherein the mutual interest is inferred to be an interest by the first user and the second user to be physically proximal.

18. The system of claim 17, further comprising:
an expression of interest function that enables the first user to explicitly express an interest to the second user to be physically proximal to the second user.

19. The system of claim 15, further comprising:
the mutual interest inference function that infers the mutual interest between the first user and the second user, wherein the mutual interest is inferred to be an interest by the first user to be physically proximal to the non-human physical object.

20. The system of claim 15, further comprising:
the match delivery function that delivers the information to the first user that is associated with the match between the first user and the second user, wherein the information comprises a computer-implemented map.

* * * * *